United States Patent Office 3,775,475
Patented Nov. 27, 1973

---

3,775,475
TELOMER PRODUCTS
Roy T. Holm, Orinda, Rupert C. Morris, Berkeley, and James W. Hayden, Richmond, Calif., assignors to Shell Oil Company, New York, N.Y.
No Drawing. Filed Apr. 28, 1971, Ser. No. 138,376
Int. Cl. C07c 59/12
U.S. Cl. 260—535 P        8 Claims

ABSTRACT OF THE DISCLOSURE

Novel linear telomers of $C_4$ ethylenically unsaturated dicarboxylic acids or derivatives thereof are produced by telomerizing a $C_4$ ethylenically unsaturated dicarboxylic acid or derivative thereof with certain alkyl ester or alkylene carbonate reactant in the presence of a free-radical catalyst. The telomers are converted by saponification with alkali metal or ammonium hydroxide solutions to substantially biodegradable, water-soluble polycarboxylate salts terminated with an hydroxy-substituted alkyl end group. The compounds are used as detergent builders.

BACKGROUND OF THE INVENTION

The homopolymerization of dicarboxylic acids and derivatives thereof is known in the art. For example, the homopolymerization of maleic anhydride using acetyl peroxide as the polymerization initiator is disclosed in U.S. Pat. 3,359,246, issued to J. S. Berry on Dec. 19, 1967. Another process is the homopolymerization of maleic anhydride using a mixed maleic-acyl peroxide initiator, as disclosed in U.S. Pat. 3,513,136, issued to J. H. Blumbergs on May 19, 1970. Other patents directed to the homopolymerization of maleic anhydride are U.S. 3,385,834, issued to A. Merijan on May 28, 1968, and U.S. 3,457,240, issued to C. Heuck et al. on July 22, 1969.

The telomerization of maleic anhydride is also known. This reaction involves the addition of maleic anhydride, called a taxogen, to a second reactant, called a telogen, to produce a product called a telomer, as depicted in the following Equation 1:

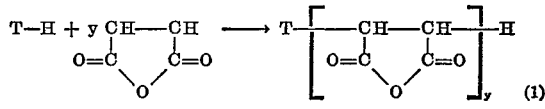

(1)

Telogen   Taxogen       Telomer wherein T—H represents the second reactant. The telomerization of maleic anhydride and hydrocarbons such as cumene and isohexane is disclosed in British Pat. 1,063,036, issued to Farbwerke Hoechst on Mar. 22, 1967.

Polyelectrolytes, e.g., polycarboxylate salts of homopolymaleic anhydride have been considered as substitutes for the phosphate builders in detergent compositions. However, despite considerable research, suitable biodegradable substitutes are not available. The problems associated with attempts to develop a biodegradable polyelectrolyte are reported in Chemical Week, Feb. 17, 1971, pp. 41–43.

SUMMARY OF THE INVENTION

It has now been found that novel polycarboxylic acid (or derivatives thereof) telomers having an ester or carbonato-containing end group are produced by telomerizing a $C_4$ ethylenically unsaturated dicarboxylic acid or derivative thereof with an alkyl ester or alkylene carbonate reactant in the presence of at least one radical-liberating compound as catalyst. The novel telomers are converted by saponification to water-soluble, substantially biodegradable polycarboxylate telomers terminated with an hydroxy-substituted alkyl end group.

DESCRIPTION OF PREFERRED EMBODIMENTS

Telomerization reaction.—The polycarboxylic acid (or derivative thereof) telomers of the invention are produced by the telomerization of a $C_4$ ethylenically unsaturated dicarboxylic acid or a derivative thereof (taxogen) and certain alkyl esters or alkylene cyclic carbonates (telogen) in the presence of at least one radical-liberating compound. By way of illustration, the telomerization of maleic anhydride and propylene carbonate in the presence of acetyl peroxide is depicted in Equation 2 where $n$ is a whole number as is defined hereinbelow.

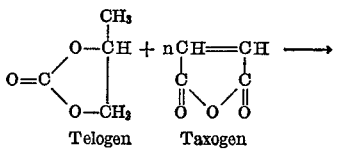

Telogen   Taxogen

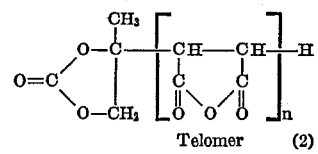

Telomer        (2)

Illustrative $C_4$ ethylenically unsaturated dicarboxylic acids and derivatives thereof suitably employed in the telomerization reaction are maleic acid, fumaric acid, maleic anhydride, and $C_1$–$C_4$ dialkyl maleates and fumarates, e.g., methyl fumarate, ethyl maleate, propyl fumarate and butyl maleate. Preferred for use as the taxogen in the telomerization reaction are maleic acid derivatives, particularly maleic anhydride.

Suitable alkyl ester telogen reactants of the telomerization process have from 4 to 15 carbon atoms, preferably from 5 to 10 carbon atoms, and are represented by the Formula I

(I)

wherein A is alkanoyloxy of 2 to 6 carbon atoms, e.g.,

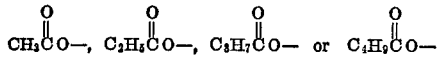

R and R′ independently are hydrogen or alkyl of 1 to 4 carbon atoms and free of quaternary carbon atoms, i.e., alkyl of 1 to 4 non-quaternary carbon atoms such as methyl, ethyl, n-propyl, isopropyl, n-butyl or isobutyl, and A′ is hydrogen or A. Illustrative of suitable alkyl mono esters of Formula I (wherein A′ is H) therefore are isopropyl acetate, isopropyl n-propionate, isopropyl n-butyrate, isopropyl isobutyrate, isobutyl acetate and sec-butyl acetate. Illustrative of suitable alkyl diesters of Formula I (wherein A′ is alkanoyloxy) are ethanediol diacetate, 1,2-propanediol diacetate 1,2-butanediol diacetate, 2,3-butanediol dipropionate, 1,2-pentanediol dibutyrate and 2,3-hexanediol diacetate. Preferred alkyl esters of Formula I are those wherein R is n-alkyl, especially methyl, and A is n-alkanoyloxy, especially acetoxy.

Suitable alkylene cyclic carbonates telogen reactants have from 3 to 20 carbon atoms, preferably 3 to 15 carbon atoms, and are represented by the Formula (II)

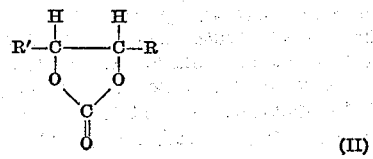

(II)

wherein R and R' independently are hydrogen or alkyl of from 1 to 4 carbon atoms and free of quaternary carbon atoms. Illustrative alkylene cyclic carbonates of Formula II therefore are ethylene carbonate, propylene carbonate, 1,2-butylene carbonate, 2,3-butylene carbonate, 1,2-hexylene carbonate, 1,2-dodecylene carbonate and 1,2-nonadecylene carbonate. Preferred alkylene carbonates of Formula II are those wherein R is n-alkyl, especially methyl, and R' is n-alkyl or hydrogen.

The alkylene carbonates of Formula II are preferred over the alkyl esters of Formula I as the telogen reactant in the telomerization process.

In the telomerization reaction, the bond connecting a hydrogen atom depicted in Formulas I and II of the telogen is cleaved and the resulting fragments (i.e., the hydrogen atom and the remainder of the telogen molecule) become the terminal groups of the polycarboxylic acid (or derivative) telomer (see Equation 1). Although it is not desired to be bound by any particular theory, it is believed that the oxygen-containing ester or carbonate groups of the telogen facilitates the cleavage of the hydrogen-carbon bond during the free-radical catalyzed telomerization reaction.

Molar ratios of taxogen to telogen employed in the telomerization reaction suitably vary from about 1:10 to 40:1. The preferred molar ratios of taxogen to telogen vary from about 1:5 to 20:1 and particularly preferred molar ratios vary from about 1:2 to 5:1.

The telomerization reaction is initiated by an organic peroxide-type or azo-type free-radical initiator. Suitable organic peroxides include dialkanoyl peroxides of 4 to 40 carbon atoms such as acetyl peroxide and lauroyl peroxide; diaroyl peroxides of 12 to 20 carbon atoms such as benzoyl peroxide and 2,4-dichlorobenzoyl peroxide, tertiary alkyl hydroperoxides of 4 to 10 carbon atoms such as t-butyl hydroperoxide; aralkyl hydroperoxides 8 to 20 carbon atoms such as cumene hydroperoxide and ethylbenzene hydroperoxide; di-tertiary alkyl peroxides of 8 to 20 carbon atoms such as t-butyl peroxide and dicetyl peroxide; alkyl perbenzoates of 7 to 20 carbon atoms such as tertiary butyl perbenzoate; dialkyl ketone peroxides of 3 to 10 carbon atoms such as methyl ethyl ketone peroxide and diethyl ketone peroxide; cycloalkanone peroxides such as cyclohexanone peroxides such as cyclohexanone peroxide; and dialkyl peroxycarbonates of 3 to 20 carbon atoms such as diethyl peroxycarbonate and diisopropyl peroxycarbonate. Suitable azo-type compounds include alpha,alpha'-azo-bis-isobutyronitrile, p-bromobenzenediazonium fluoborate, p-tolyldiazo-aminobenzene, p-bromobenzenediazonium hydroxide, azomethane and phenyldiazonium chloride. Preferred free-radical initiators are organic peroxides and particularly preferred are dialkanoyl peroxides, especially acetyl peroxide.

The free-radical initiator employed in the telomerization reaction generally is present in an amount of from about 1% to about 10% by weight of the taxogen reactant but preferably is present in amount of from about 2% to 6%, calculated on the same basis.

The telomerization reaction is conducted in the liquid phase in the absence or presence of a reaction diluent which is liquid at reaction temperature and pressure and inert to the reactants and the free-radical initiator. Preferred diluents are those in which the telomers products are essentially insoluble. Illustrative inert diluents in which the telomer products are essentially insoluble are aromatic hydrocarbons such as benzene and toluene, n-alkanes such as n-hexane and n-decane and cycloalkanes such as cyclohexane. In many modifications of the telomerization reaction, a portion of the telogen suitably serves as reaction diluent and no added diluent is employed. When diluent is utilized, however, amounts up to about 50 moles of diluent per mole of telogen are satisfactory, but amounts up to about 20 moles of diluent per mole of telogen are preferred. The process is suitably conducted in an inert reaction environment so that the presence of reactive materials such as water and oxygen is desirably avoided. Reaction conditions are therefore substantially anhydrous and substantially oxygen-free.

The precise method of conducting the telomerization reaction is not critical. In one modification, the taxogen, telogen and free-radical initiator are charged to a reactor and the reaction mixture is maintained with agitation at reaction temperature and pressure for the desired reaction period. Another modification comprises adding, in a continuous manner, the free-radical initiator to a solution of the taxogen and telogen contained in a reactor maintained at reaction temperature and pressure. By any modification, the telomerization reaction is conducted at moderate temperatures and pressures. Although the reaction temperature depends in part upon the decomposition temperature of the free-radical initiator, suitable temperatures generally vary from about 25° C. to 200° C., but preferably from 50° C. to 150° C. The precise pressure is not critical, so long as the reaction mixture is maintained substantially in a non-gaseous phase. Typical pressures vary from about atmospheric to 100 p.s.i.g.

The telomer product mixture is separated and recovered from the telomerization reaction mixture by conventional methods such as filtration and precipitation. When the telomerization process is conducted in an inert diluent such as benzene, the telomer product mixture generally precipitates from the reaction mixture and is separated by filtration.

The telomer products.—Specific examples of the telomers of the invention include the following (wherein n is whole number from 2 to 40 inclusive).

(1) Telomers of ethyl maleate and 1,2-propanediol diacetate:

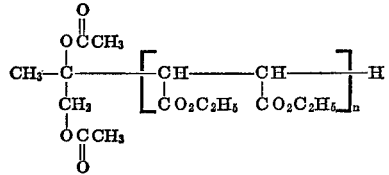

(2) Telomers of fumaric acid and isopropyl acetate:

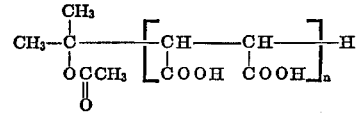

(3) Telomers of maleic anhydride and ethylene carbonate:

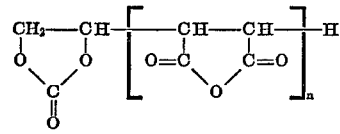

(4) Telomers of propylene carbonate and maleic anhydride:

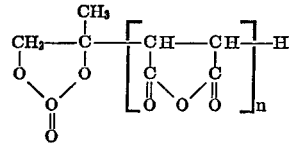

The preferred telomers of the invention are those prepared from maleic anhydride. Generally, such alkanoyloxy or carbonato-containing telomers are represented by the Formula III

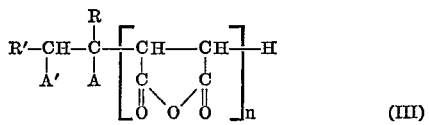
(III)

wherein R' and R independently are hydrogen or alkyl of 1 to 4 carbon atoms and free of quatrenary carbon atoms, A is alkanoyloxy of 2 to 6 carbon atoms, and A' is hydrogen or A and n is a whole number from 2 to 40 inclusive, preferably from 3 to 30 inclusive, more preferably from 3 to 15 inclusive, with the proviso that the A' and A groups can together form a cyclic carbonato group

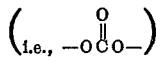

The telomer products of the invention are converted by saponification with alkali metal or ammonium hydroxide solutions at elevated temperatures, e.g., 50° C. to 100° C., to water-soluble polycarboxylate salts. In addition to converting the anhydride, ester or carboxy groups of the taxogen portion of the telomer to carboxylate salts, the saponification reaction also converts the carbonato and alkanoyloxy groups of the telogen to hydroxyl groups.

The water soluble polycarboxylate telomers produced by saponification are represented by the Formula IV:

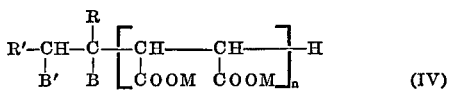
(IV)

wherein R', R, and n have the same significance as defined in Formula III, M is ammonium or an alkali metal, preferably sodium or potassium, B is hydroxyl and B' is hydrogen or B.

The team n in Formulas III and IV represents the number of taxogen units per telogen unit in the telomer molecule (i.e., the degree of telomerization). The telomers of the invention are therefore in reality a mixture of telomers having 2 to 40 molecules of taxogen per molecule of telogen. However, although the mixture of telomers on occasion contains individual telomer molecules which have molecular weights up to about 4000 (e.g., when n=40), the entire telomer mixture (calculated as the anhydride or acid form) has a number-average molecular weight (as determined by vapor pressure osmometry) of less than 1,200, preferably less than 1000. Generally, the number-average molecular weight of the telomer mixture (calculated as the anhydride or acid form) varies from 300 to 1200, preferably from 300 to 1000, more preferably from 500 to 800.

As heretofore indicated, the telomers of Formulas III and IV having the lower degrees of telomerization (i.e., n of 3 to 30 or 3 to 15) and therefore narrower molecular weight distributions are preferred products of the invention. Such telomers of narrower molecular weight distribution are preferred largely because the water soluble salts are generally more biodegradable. Such telomers are produced in the telomerization process when the process is conducted in inert diluents in which the telomer product is essentially insoluble. Such inert diluents are aromatic hydrocarbons such as benzene and toluene or n-alkanes of 6 to 20 carbons such as n-hexane or n-decane. Although it is not desired to be bound by any particular theory, it is considered likely that the inert diluent causes the telomer product to precipitate from the reaction mixture before the telomer chain grows to telomer products of high molecular weight.

Alternatively, telomers of Formula III having the narrower molecular weight distributions can be obtained by fractional precipitation. In fractional precipitation, a sample of the telomer is dissolved in a small quantity of an inert organic solvent, e.g., oxygenated polar organic solvents such as methyl ethyl ketone or ethylene glycol dimethyl ether, contained in a stirred vessel. Small quantities of a diluent in which the telomer is essentially insoluble, e.g., benzene or isooctane, are added with stirring at room temperature until a precipitate is formed. The precipitate is removed by filtration, washed with the diluent used in the precipitation and dried. The filtrate is stirred in a vessel and successive additives of the precipitating diluent are made to this filtrate until a second precipitate is obtained. This second precipitate is separated, washed and dried in the same manner as the first precipitate. A third, fourth and, if necessary, a fifth precipitation is carried out in the same manner so that most of the telomer originally dissolved in the solvent is recovered in the form of fractional precipitates. The first fractions of precipitates consist essentially of higher molecular weight telomer molecules while the last fractions of precipitates and the residue obtained by evaporation of the filtrate consist essentially of telomer molecules of lower molecular weight, i.e., the last fractions and the residue consist essentially of telomers of Formula III having n values of 3 to 30, preferably 3 to 15.

The water soluble salts of Formula III have utility as biodegradable builder materials for improving the detergency levels of soaps and synthetic detergents. For example, the water soluble salts of the invention are useful as builders with organic-water-soluble detergent surfactants such as anionic, nonionic, zwitterionic, ampholyic surfactants, and mixtures thereof. Examples of suitable organic surfactants and suitable proportions of organic surfactant to builder materials are disclosed in U.S. Pat. 3,308,067, issued Mar. 7, 1967, and the disclosure of this patent is hereby incorporated by reference.

In use as detergent builder materials, the water-soluble polycarboxylate telomers of Formula III having a $Ca^{++}$ sequestering ability of about 1 to 15 g. $Ca^{++}/100$ g. is generally satisfactory, although a $Ca^{++}$ sequestering ability of about 3 to 12 g. $Ca^{++}/100$ g. is preferred.

The telomerization reaction is a free-radical catalyzed reaction. In free-radical catalyzed reactions it is well known that two radicals can couple in a chain terminating reaction. Accordingly, it is appreciated that the telomer product mixture likely comprises small amounts of compounds represented by Formula V

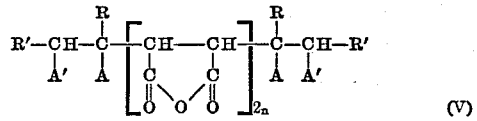
(V)

which compounds arise from the coupling of two radicals.

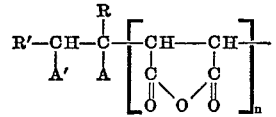

Generally, however, the telomer product mixture comprises at least 90% w. of the telomers represented by Formula III or IV, preferably at least 95% of the telomers represented by Formula III or IV, and has a number-average molecular weight of less than 1200 as hereinbefore defined.

Since the telomerization reaction is a free-radical reaction, hydrogen abstraction from a growing telomer chain may lead to branching in the telomer molecule. Therefore, in designating the structure of the telomer products of the invention by Formulas III and IV, it is not desired to imply that the telomer products are completely linear. However, it is known that linear polyelectrolytes are more biodegradable than branched ones. (See Chemcal Week, Feb. 17, 1971, pp. 41–43). Accordingly, since the water-soluble polycarboxylate telomers of the invention are substantially biodegradable, it is considered likelk that the telomer products of the invention are essentially linear.

ILLUSTRATIVE EMBODIMENT 1

A 5 g. sample of 25% w. acetyl peroxide in dimethyl phthalate was added to a solution of 25 g. maleic anhydride and 5 ml. of isopropyl acetate contained in a glass reactor maintained at 75° C. and under an atmosphere of nitrogen. The resulting rection mixture was kept at 75° C. for 3 hours and then at 100° C. for another 3 hours. The reaction mixture was then cooled and poured into about 1.5 liters of toluene. The telomer product mixture precipitated as a fine violet red powder. The precipitated telomer product mixture was washed with toluene and dried in an oven maintained at 65° C. A 19.5 g. sample of the isopropyl acetate/maleic anhydride product telomer was obtained (78% conversion of maleic anhydride).

Vapor pressure osmometric molecular weight determination on the telomer product gave a number average molecular weight of 1000.

A portion of the telomer product was dissolved in water and neutralized to pH 10 with sodium hydroxide solution. The solution was heated on a steam bath for about one hour. Sufficient sodium hydroxide was then added to adjust the pH of the solution to 10. The solution was then evaporated to dryness on a steam bath to give the pale yellow hydroxyalkyl/sodium polycarboxylate telomer as a dry powder.

ILLUSTRATIVE EMBODIMENT 2

A 5 g. sample of 25% w. acetyl peroxide in dimethyl phthalate was added to a solution of 25 g. maleic anhydride, 5 ml. of isopropyl acetate and 100 ml. of benzene contained in a glass reactor maintained at 75° C. and under an atmosphere of nitrogen. The resulting reaction mixture was maintained at 75–84° C. for 6 hours during which time the telomer product precipitated. The telomer product was filtered, washed with toluene and dried. A 11.8 g. sample of isopropyl acetate/maleic anhydride telomer product was obtained. The number-average molecular weight was 537 (vapor pressure osmometry) and weight-average molecular weight was 1570 (ultra-centrifuge).

The number-average molecular weight of the telomer product determined by vapor pressure osmometry is sensitive to the number of molecules present and not to their masses. The weight-average molecular weight of the telomer product determined by ultra-centrifuge is sensitive to the mass of a molecule and not to the number of molecules. A telomer product with a number-average molecular weight of 537 and a weight-average molecular weight of 1570 has a broad molecular weight distribution with molecules of molecular weight lower than 537 and higher than 1570. If only one molecular weight species were present the same value would be obtained by either method of molecular weight determination.

By a procedure identical to that described in Illustrative Embodiment 1, a portion of the telomer product was converted to the hydroxyalkyl/sodium polycarboxylate salt.

ILLUSTRATIVE EMBODIMENT 3

A mixture of 25 g. maleic anhydride, 25 ml. of propylene carbonate, 5 g. of 25% w. acetyl peroxide in dimethyl phthalate and 100 ml. of benzene was reacted at 75–85° C. for 6 hours by a procedure identical to that described in Illustrative Embodiment 2. A 19.5 g. sample of propylene carbonate/maleic anhydride telomer product having a number-average molecular weight of 368 (vapor pressure osmometry).

By a procedure identical to that described in Illustrative Embodiment 1, the telomer was converted to a sodium polycarboxylate telomer product having a dihydroxyalkyl group. The presence of the vic-glycol group in the telomer was confirmed by a positive periodic acid test. The molecular weight as determined from the vic-glycol analysis was 1008 (calculated as the anhydride form).

ILLUSTRATIVE EMBODIMENT 4

A mixture of 50 g. of maleic anhydride, 10 ml. of cumene and 10 g. of 25% w. acetyl peroxide in dimethyl phthalate was reacted at 75–100° C. for 6 hours by a procedure identical to that described in Illustrative Embodiment 1. A 31.4 g. sample of cumene/maleic anhydride telomer having a number-average molecular weight of 756 (vapor pressure osmometry) was obtained.

By a procedure identical to that described in Illustrative Embodiment 1, the cumene/maleic anhydride telomer was converted to a cumene/sodium polycarboxylate telomer.

ILLUSTRATIVE EMBODIMENT 5

A 3.03 g. sample of 2,3-$^{14}$C-maleic anhydride was homopolymerized using 0.6 g. of 25% w. acetyl peroxide in dimethyl phthalate at 75–100° C. for 6 hours by a procedure similar to that disclosed in U.S. Pat. 3,359,246. A 2.24 g. sample of homopolymaleic anhydride polymer having a number-average molecular weight of 2600 (vapor phase osmometry) and a radioactivity count of 20.28 μc./g. was obtained.

By a procedure similar to that described in Illustrative Embodiment 1, a portion of the polymer was converted to sodium polymaleate.

ILLUSTRATIVE EMBODIMENT 6

A 3.0 g. sample of 2,3-$^{14}$C-maleic anhydride was homopolymerized using 5 g. of 25% w. acetyl peroxide in dimethyl phthalate at 85° C. for ½ hour by a procedure similar to that of Illustrative Embodiment 5. A 1.85 g. sample of homopolymaleic anhydride polymer having a number average molecular weight of 681 (vapor phase osmometry) was obtained.

By a procedure similar to that described in Illustrative Embodiment 1, a portion of the polymer was converted to sodium polymaleate having a radioactivity count of 8.64 μc./g.

ANALYTICAL TECHNIQUE 1

The biodegradability of a sample of the dihydroxyalkyl/ sodium polycarboxylate telomer prepared in Illustrative Embodiment 3 was determined using the Soap and Detergent Association's (SDA) Biodegradation Test Method reported in McCutcheon's Detergents and Emulsifiers, 1967 Annual, pp. 129–138.

The biotreater and test procedure were essentially identical to the SDA Biodegradation Test Method except that the test procedure was shortened to two days acclimation and from three to five days level operation. Fresh sludge from the city of San Ramon, Calif., activated sewage plant was employed. The synthetic sewage solution employed consisted of 130 p.p.m. glucose, 130 p.p.m. nutrient broth, 130 p.p.m. beef extract, 130 p.p.m. $K_2HPO_4$ and 25 p.p.m. $(NH_4)_2SO_4$.

The biotreater was charged with 1 liter of fresh sludge and sufficient tap water (about 500 ml.) to give a suspension having 2000–3000 milligrams per liter of suspended solids (sludge volume index) and maintained at a temperature of 25° C.

After one day of acclimation and after settling, 1 liter of supernatant was removed from the biotreater and replaced with one liter of the synthetic sewage containing 10 p.p.m. of the polycarboxylate telomer and after the second day of acclimation, 1 liter of supernatant was removed from the biotreater and replaced with one liter of the synthetic sewage containing 20 p.p.m. of the polycarboxylate telomer. During the periods of level operation, one lither of supernatant liquid was removed each day from the biotreater and was replaced with one liter of the synthetic sewage containing 20 p.p.m. of the polycarboxylate telomer.

The supernatant liquids removed from the biotreater during the periods of level operation were analyzed for the undegraded telomer using the Magnesium-Eriochrome Black T-Spectrophotometric Color Test described in Analytical Technique 2. The color test showed an average of 2 p.p.m. of undegraded polycarboxylate telomer in the supernatant liquid during the periods of level operation which amount corresponds to a 90% biodegradation of the polycarboxylate telomer, based on the daily charge of 20 p.p.m. telomer to the biotreater during the periods of level operation.

The percent biodegradation refers to the percent reduction of the polycarboxylate telomer from the supernatant liquid. It is appreciated, of course, that the supernatant liquid from the laboratory biotreater corresponds to the effluent stream from an actual activated sewage plant.

During operation of the biotreater, the sewage sludge remained as a fine suspension of solids.

ILLUSTRATIVE EMBODIMENT 7

The biodegradability of a sample of the $^{14}C$-labeled sodium polymaleate polymer (molecular weight 681) prepared in Illustrative Embodiment 6 was determined using the procedure described in Analytical Technique 1.

After the fifth day of operation of the biotreater, the color test showed 11 p.p.m. of undergraded polymer in the supernatant liquid which amount corresponds to a 45% biodegradation of the polymaleate polymer, based on the 20 p.p.m. of polymer charged to the biotreater.

The radioactivity count of the supernatant liquid indicated that it contained 8.2 p.p.m. undegraded polymer and/or polymer metabolites. This result and the color test data therefore show that all the radioactive $^{14}C$ present in the supernatant liquid is incorporated in the undegraded polymer.

The sewage sludge in the biotreater was observed to aggregate into a sticky ball after several days of operation. In contrast, the sewage sludge remained as a fine suspension in the biodegration experiments with the polycarboxylate telomers of the invention (see Analytical Technique 1).

ILLUSTRATIVE EMBODIMENT 8

The biodegradability of a sample of the $^{14}C$-labeled sodium polymaleate polymer prepared in Illustrative Embodiment 5 was determined using the procedure described in Analytical Technique 1.

After the fifth day of operation of the biotreater, the color test showed 17 p.p.m. of undegraded polymer in the supernatant liquid. The polymer was therefore 15% biodegraded, based on the 20 p.p.m. of polymer charged to the biotreater.

ILLUSTRATIVE EMBODIMENT 9

The biodegradability of a sample of the cumene/sodium polycarboxylate of Illustrative Embodiment 4 was determined using the procedure described in Analytical Technique 1.

After the fifth day of operation of the biotreater, the color test showed 14 p.p.m. of undegraded telomer in the supernatant liquid. The telomer was therefore 30% biodegraded, based on the 20 p.p.m. of telomer charged to the biotreater.

ILLUSTRATIVE EMBODIMENT 10

The $Ca^{++}$ sequestering ability of the novel water-soluble polycarboxylate telomers prepared in Illustrative Embodiments 1–3 was determined by the titration of the telomer with calcium nitrate in the presence of oxalic acid using the nephelometric method disclosed by Irani and Callis, J. Phys. Chem., 64, 1398 (1960) and J.A.O.C.S., 39, 156 (1962). For comparison, the $Ca^{++}$ sequestering abilities of sodium tripolyphosphate as well as several widely used sodium tripolyphosphate replacements were determined. The results are provided in Table I. The polycarboxylate telomer molecular weights reported in the table are number-average molecular weights of the anhydride form.

TABLE I.—COMPARATIVE SEQUESTERING ABILITY

| Builder: | Sequestering ability, g. $Ca^{++}$/100 g. |
|---|---|
| Sodium metasilicate | 1 |
| Citric acid | 1 |
| Tetrasodium pyrophosphate | 4.6 |
| Sodium tripolyphosphate | 9.4 |
| Nitrilotriacetic acid | 12.4 |
| Hydroxyalkyl/sodium polycarboxylate (mole wt. 527) | 9.4 |
| Hydroxyalkyl/sodium polycarboxylate (mole wt. 1000) | 13.8 |
| Dihydroxyalkyl/sodium polycarboxylate (mol wt. 368) | 12.2 |

ILLUSTRATIVE EMBODIMENT 11.—FRACTIONAL PRECIPITATION

A 25 g. sample of propylene carbonate/maleic anhydride having number-average molecular weight 440 (prepared by procedure described in Illustrative Embodiment 3) was dissolved in 80 ml. of methyl ethyl ketone contained in a stirred vessel. Toluene was added in portions until precipitation occurred. The following results were obtained from a series of five fractional precipitations.

| Volume of toluene added, ml. | Fraction | Color | Number, average mole wt. | Weight |
|---|---|---|---|---|
| 540 | 1 | Purple | | 1.55 |
| 50 | 2 | Dark red | | 5.18 |
| 140 | 3 | Pale tan | | 3.51 |
| 60 | 4 | Off-white | | 3.05 |
| 60 | 5 | do | | 2.39 |
| | Filtrate residue | Light-yellow | 353 | 5.22 |

ILLUSTRATIVE EMBODIMENT 12

A detergent composition having a novel water-soluble telomer salt of the invention as a builder material has the following composition

| Component: | Percent w. |
|---|---|
| Neodol® 25–9 detergent alcohol ethoxylate (marketed by the Shell Chemical Co.) | 15 |
| Sodium silicate | 7 |
| Sodium carboxymethyl cellulose | 1 |
| Sodium sulfate | 37 |
| Dihydroxyalkyl/sodium polycarboxylate of Illustrative Embodiment 3 | 40 |

ANALYTICAL TECHNIQUE 2

Determination of polycarboxylate telomers in supernatants from activated sludge biodegrations: magnesium - Eriochrome Black T - spectrophotometric method

METHOD SUMMARY

A measured volume of the supernatant from a biodegradation experiment is passed through a column of cation exchange resin in the sodium form to remove metal ions and replace them with sodium. The column is washed and the combined effluent and washings diluted to a fixed volume with deionized water. A measured volume of the solution from ion exchange then is mixed with a measured volume of an aqueous solution of Mg-Eriochrome Black T reagent at pH 10. The polycarboxylate telomer selectively chelates the magnesium ion and liberates the blue Eriochrome Black T. The absorbance of the solution at 638 m$\mu$ (that of the Eriochrome Black T) is measured using a spectrophotometer. The net absorbance of the solution over that of a blank is converted to micrograms of polycarboxylate telomer by reference to a calibration curve prepared from known amounts of the *same* polycarboxylate telomer,

APPARATUS (a) Ion-exchange column, 14 mm. O.D. x 10 cm. long, with stopcock, drip tip and a 19/22 outer joint.
(b) Funnel, with 19/22 inner joint, 120 ml. capacity.
(c) Flask, volumetric, 100 ml., polypropylene.
(d) Cylinders, 100 ml., graduated, plastic.
(e) Cuvette, 5 cm. light path.
(f) Spectrophotometer.

REAGENTS (a) Magnesium solution. 0.01 M, dissolve 0.2465 g. $MgSO_4 \cdot 7H_2O$ in one liter of water.
(b) Buffer solution, pH 10, add 67.5 g. of ammonium chloride to 570 ml. of ammonium hydroxide in a one liter volumetric flask. Dilute to one liter with water. Shake until the ammonium chloride is dissolved. Store in a plastic bottle.
(c) Magnesium - Eriochrome Black T reagent, place 0.0114 g. of Eriochrome Black T [sodium 1-(1-hydroxy-2-naphthylazo)-6-nitro-2-naphthal-4-sulfonate] in a one liter plastic bottle. Add 500 ml. of water and 100 ml. of pH 10 buffer solution. Shake until the Eriochrome Black T is dissolved. Add 2.00 ml. of the magnesium solution. Dilute to one liter with water and mix thoroughly. Prepare fresh daily.
(d) Polycarboxylate telomer standard solution, 100 p.p.m., place 100 mg. of the polycarboxylate telomer to be tested in a 100 ml. plastic volumetric flask, dissolve in deionized water, dilute to the mark and mix thoroughly.
(e) Cation exchanger resin, AG 50W-X4, 50-100 mesh, sodium form. Available from Bio-Rad Laboratories, Richmond, Calif.

PROCEDURE

Ion exchange.—Attach the funnel to the ion exchange column, close the stopcock, and add deionized water to fill the column. Add sufficient resin to give a resin bed 10 cm. in height (approximately 10 cc.). Add water to the funnel, open the stopcock and allow water to drip through the column at the rate of 1–2 ml. per minute. Wash the funnel and column with an additional 50 ml. of deionized water and force the liquid to the top of the resin using a rubber bulb. Place a 100 ml. plastic volumetric flask to catch the effluent from the column. Close the stopcock and add 80 ml. of well mixed supernatant liquid from the biodegradation to the funnel and column. Open the stopcock and allow the liquid to flow at the rate indicated. When flow stops, force the liquid standing above the resin to the top of the resin with a rubber bulb. Wash down the funnel with a stream of deionized water from a wash bottle and force the washings into the resin. Repeat the washing step two additional times. Add deionized water and continue to collect effluent until the liquid in the flask is at the mark. Stopper and mix the contents of the flask.

Calibration.—Into 100 ml. plastic graduated cylinders pipet sufficient polycarboxylate telomer solution to give 100, 300, 500, 600 micrograms of polymaleate. Dilute to 50 ml. with water. Added 50 ml. of water to a plastic cylinder to serve as a blank. To all of the gradated cylinders add 50 ml. of the magnesium-Eriochrome Black T reagent. Mix thoroughly and after 5 minutes read the absorbance of each solution at 638 m$\mu$. Using a 5 cm. cell and air as the reference, substract the absorbance of the blank from each of the other absorbances and make a plot of these differences versus milligrams of polycarboxylate telomer.

Color development.—Place a measured volume of sample solution containing 100 to 600 micrograms of polycarboxylate telomer into a 50 ml. plastic graduated cylinder. Do not use more than 50 ml. of sample. Dilute to 50 ml. with water. Prepare a blank using 50 ml. of water. Add 50 ml. of the magnesium-Eriochrome Black T reagent, mix thoroughly and after 5 minutes read the absorbances of the solutions at 638 m$\mu$. Subtract the absorbance of the blank from the sample absorbance and obtain the amount of polycarboxylate telomer present from the calibration curve.

Calculations.—Calculate the concentration of polycarboxylate telomer in the effluent sample as follows:

$$\text{Telomer, p.p.m.} = \frac{(A)}{V} \frac{100}{(80)}$$

where
A = micrograms of obtained from the calibration curve.
V = volume of sample taken for color development.

ACCURACY AND PRECISION

The accuracy and precision of the method is approximately ±10%.

ILLUSTRATIVE EMBODIMENT 13

A mixture of 49 g. of maleic anhydride and 3 g. of benzoyl peroxide was reacted at 130° C. for 2½ hours by a procedure similar to that of Illustrative Embodiment 1. A 20.1 g. sample of polymaleic anhydride polymer was obtained.

By a procedure identical to that described in Illustrative Embodiment 1, the polymer was converted to a sodium polymaleate polymer. The sodium polymaleate polymer was essentially *insoluble* in water.

ILLUSTRATIVE EMBODIMENT 14

A mixture of 25 g. maleic anhydride, 5 ml. ethylene carbonate, 5 g. of 25% w. acetyl peroxide in dimethyl phthalate and 100 ml. benzene was reacted at 75–84° C. for 6 hours by a procedure identical to that described in Illustrative Embodiment 2. A 15.4 g. of ethylene carbonate/maleic anhydride telomer product having a number-average molecular weight of 526 (vapor pressure osmometry) was obtained.

By a procedure identical to that described in illustrative Embodiment 1, a portion of the telomer product was converted to the dihydroxyethyl/sodium polycarboxylate telomer which dihydroxyethyl/sodium polycarboxylate telomer which has a $Ca^{++}$ sequestering ability of 12 g. $Ca^{++}$/100 g.

ILLUSTRATIVE EMBODIMENT 15

A mixture of maleic anhydride, 1,2-propanediol diacetate and alpha,alpha'-bis-azoisobutyronitrile in benzene solution is telomerized by a procedure similar to that described in Illustrative Embodiment 2. A 1,2-propanediol diacetate/maleic anhydride telomer is obtained.

ILLUSTRATIVE EMBODIMENT 16

A mixture of maleic anhydride, 2,3-butylene carbonate and di-tert. butyl peroxide in benzene solution is telomerized by a procedure similar to that described in Illustrative Embodiment 2. A 2,3-butylene carbonate/maleic anhydride telomer is obtained.

We claim as our invention:
1. An essentially linear mixture of water-soluble, substantially biodegradable salts of the formula

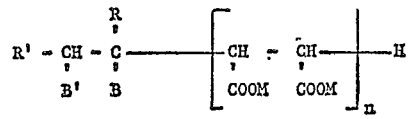

wherein R and R' independently are hydrogen or alkyl of 1 to 4 non-quaternary carbon atoms, B is hydroxyl, B' is B or hydrogen, n is a whole number of from 2 to 40 inclusive and M is an alkali metal or ammonium, with the proviso that the number-average molecular weight of the acid form of said salt mixture is less than 1200.

2. The salts of claim 1 wherein M is sodium or potassium.

3. The salt mixture of claim 2 wherein R group is n-alkyl.

4. The salt mixture of claim 2 wherein B' is hydrogen and R' is hydrogen or n-alkyl.

5. The salt mixture of claim 4 wherein R is methyl and R' is hydrogen.

6. The salt mixture of claim 3 wherein B' and B are hydroxyl.

7. The salt mixture of claim 3 wherein R' is hydrogen and R is methyl.

8. The salt mixture of claim 1 wherein $n$ is 3 to 15 and the number-average molecular weight of the acid form of said salt mixture is 500 to 800.

References Cited
UNITED STATES PATENTS
3,308,067  3/1967  Diehl _____ 252—161

JAMES A. PATTEN, Primary Examiner

P. J. KILLOS, Assistant Examiner

U.S. Cl. X.R.

252—89, 184, Digest #6; 260—340.2, 346.8, 484 A, 488 R, 491, 515 P, 537